(12) United States Patent
Klein et al.

(10) Patent No.: US 7,676,523 B2
(45) Date of Patent: Mar. 9, 2010

(54) METHOD AND SYSTEM FOR MANAGING DATA QUALITY

(75) Inventors: Anja Klein, Dresden (DE); Hong-Hai Do, Dresden (DE); Gregor Hackenbroich, Dresden (DE); Juergen Anke, Dresden (DE)

(73) Assignee: SAP AG, Walldorf (DE)

( * ) Notice: Subject to any disclaimer, the term of this patent is extended or adjusted under 35 U.S.C. 154(b) by 384 days.

(21) Appl. No.: 11/785,929

(22) Filed: Apr. 20, 2007

(65) Prior Publication Data

US 2008/0263096 A1 Oct. 23, 2008

(51) Int. Cl.
G06F 7/00 (2006.01)

(52) U.S. Cl. .................. 707/803; 707/807; 707/809; 707/811

(58) Field of Classification Search ............... 707/104.1
See application file for complete search history.

(56) References Cited

U.S. PATENT DOCUMENTS

| | | | |
|---|---|---|---|
| 5,659,683 A * | 8/1997 | Kawano et al. ............... 707/10 |
| 7,184,548 B2 | 2/2007 | Wee et al. |
| 7,197,542 B2 | 3/2007 | Ponzio, Jr. |
| 2002/0133328 A1* | 9/2002 | Bowman-Amuah .......... 703/22 |
| 2003/0051023 A1* | 3/2003 | Reichel et al. .............. 709/223 |
| 2004/0034668 A1* | 2/2004 | Gotz et al. .................. 707/201 |
| 2004/0199368 A1* | 10/2004 | Bechhoefer .................... 703/7 |
| 2005/0004789 A1* | 1/2005 | Summers ..................... 703/22 |
| 2006/0248187 A1* | 11/2006 | Thorpe et al. ............... 709/224 |

2008/0263062 A1 10/2008 Klein et al.

OTHER PUBLICATIONS

Abadi, D et al., "Aurora: A Data Stream Management System", Proceedings of the 2003 ACM SIGMOD International Conference on Management of Data (2003), 4 pages.

Babcock, B. et al., "Models and Issues in Data Stream Systems", Proceedings of the twenty-first ACM SIGMOD-SIGACT-SIGART symposium on Principles of database systems (Jun. 2002), 30 pages.

Ballou, D. P. et al., "Enhancing Data Quality in Data Warehouse Environments", Communications of the ACM, vol. 42, No. 1 (Jan. 1999), pp. 73-78.

Biswas, J. et al., "Assessing the Completeness of Sensor Data", Lecture Notes in Computer Science, vol. 3882 (Mar. 2006), 15 pages.

(Continued)

Primary Examiner—Don Wong
Assistant Examiner—Binh V Ho
(74) Attorney, Agent, or Firm—Brake Hughes Bellermann LLP

(57) ABSTRACT

A method and system are described for managing data quality. An example method may include obtaining a first data stream interval including a first group of data items and a first aggregated data quality value associated with a quality of obtaining the first group, each data item including data attribute values, each data quality item including data quality attribute values associated with one of the data items. The first aggregated data quality value, a first indicator associating the first aggregated data quality value with the first group, and the first group may be selected. The first group and the first indicator may be stored in a user table of a database. A data quality table associated with the user table may be determined based on an entry in a system table. The first aggregated data quality value and the first indicator may be stored in the data quality table.

24 Claims, 17 Drawing Sheets

OTHER PUBLICATIONS

Burdick, D et al., "OLAP Over Uncertain and Imprecise Data", Proceedings of the 31st International Conference on VLDB (Aug. 30-Sep. 2, 2005), pp. 970-981.

Chandrasekaran, S. et al., "TelegraphCQ: Continuous Dataflow Processing for an Uncertain World", Proceedings of the 2003 CIDR Conference (Jan. 2003), 12 pages.

Golab, Lukasz et al., "Issues in Data Stream Management", SIGMOD Record, vol. 32, No. 2 (Jun. 2003), pp. 5-14.

Kang, J. et al., "Evaluating Window Joins over Unbounded Streams", Proceedings of the 19th International Conference on Data Engineering (Mar. 5-8, 2003), 12 pages.

Klein, A., et al., "Representing Data Quality for Streaming and Static Data", IEEE 23rd International Conference on Data Engineering (Apr. 20, 2007), pp. 3-10.

Lee, M. L., et al., "Cleansing Data for Mining and Warehousing", Lecture Notes in Computer Science; vol. 1677, Proceedings of the 10th International Conference on Database and Expert Systems Applications (Aug. 30-Sep. 3, 1999), 10 pages.

Leser, Ulf, et al., "Query Planning with Information Quality Bounds", Proceedings of the 4th International Conference on Flexible Query Answering (FQAS), (Oct. 2000), 10 pages.

Moon, Y.S., "Efficient Stream Sequence Matching Algorithms for Handheld Devices on Time-Series Stream Data", Proceedings of the 24th IASTED International Conference on Database and Applications (Feb. 13-15, 2006), pp. 44-49.

Scannapieco, M et al., "Completeness in the Relational Model: A Comprehensive Framework", Research Paper, Ninth International Conference on Information Quality (Nov. 2004), 13 pages.

Strong, D. M. et al., "Data Quality in Context", Communications of the ACM, vol. 40, No. 5 (May 1997), pp. 103-110.

Tatbul, N. et al., "Window-Aware Load Shedding for Aggregation Queries over Data Streams", VLDB '06 (Sep. 12-15, 2006), 12 pages.

Extended EP Search Report for EP Application No. EP08005529.6, mailed on Aug. 11, 2008, 9 pages.

Non-Final Office Action for U.S. Appl. No. 11/785,928, mailed on Jun. 24, 2009, 12 pages.

* cited by examiner

100

| Timestamp | ... | 210 | 220 | 230 | 240 | 250 | 260 | 270 | 280 | 290 | 300 | 310 | 320 | 330 | 340 | 350 | 360 | 370 | 380 | 390 | 400 | ... |
|---|---|---|---|---|---|---|---|---|---|---|---|---|---|---|---|---|---|---|---|---|---|---|
| Lifetime | ... | 300 | 298 | 295 | 292 | 292 | 292 | 292 | 283 | 274 | 265 | 255 | 252 | 250 | 242 | 233 | 206 | 195 | 190 | 187 | 184 | ... |
| Accuracy | ... | 3.5 | 3.5 | 2.9 | 2.1 | 3.0 | 2.7 | 4.2 | 5.1 | 3.6 | 3.7 | 2.3 | 2.6 | 1.9 | 3.7 | 3.4 | 2.9 | 2.7 | 3.6 | 3.2 | 1.9 | ... |
| Completeness | ... | 0.9 | 0.9 | 0.8 | 1 | 0.9 | 0.85 | 0.8 | 0.75 | 0.8 | 0.8 | 0.9 | 0.9 | 0.9 | 0.8 | 1 | 1 | 1 | 1 | 1 | 1 | ... |

FIG. 8

SysQuality

| Column Name | Type | Length | Nullable | Comment |
|---|---|---|---|---|
| QualityID | Char | 36 | false | Unique identifier of the data quality information |
| Dimension | Char | 1 | false | Data quality dimension 'A' – accuracy, 'C' – completeness, ... |
| DQTable | Char | 36 | false | Foreign key pointing to the table, where dq information is stored |
| MeasColumn | Char | 36 | false | Foreign key to the column containing the measurement values |
| WindowSize | Integer | 4 | false | Size of the data quality window given by incoming data stream |

<Tablename>_DQ

| Column Name | Type | Length | Nullable | Comment |
|---|---|---|---|---|
| Column | Int | 12 | false | Foreign key pointing to the sensor data column |
| T_Begin | Int | 12 | false | Start timestamp of data quality window |
| Accuracy | Double | 12 | false | Value of the given window's accuracy |
| Completeness | Double | 12 | false | Value of the given window's completeness |
| ... | ... | ... | ... | Extendable to further DQ dimensions |

1302 — Column
1304 — T_Begin
1306 — Accuracy
1308 — Completeness

FIG. 13

METHOD AND SYSTEM FOR MANAGING DATA QUALITY

TECHNICAL FIELD

This description relates to techniques for managing data quality, for example, data quality received in data streams.

BACKGROUND

In smart item environments data associated with product usage (e.g., product lifecycle) and environmental data (e.g., humidity) may be captured via a multitude of sensors (e.g., pressure, temperature, mileage). This data may be exploited to guide and optimize production automation processes as well as complex business decisions. Some applications may directly consume streaming data, wherein the knowledge regarding current data and data quality (DQ) may be critical. Sensor data may further need to be stored in a database for further processing. A potential problem associated with sensor data is restricted data quality. Limited resolution and precision are examples of sensor inherent, physical restrictions. Further, sensor data quality may be decreased by sensor failures and malfunctions due to real world application environments such as an industrial shopfloor or mobile devices. Resolving data quality restrictions resulting directly from system components and environment may result in a significant cost increase for better sensors (e.g., with higher precision) or sensor shielding.

Measured sensor data may be used in production automation processes that are based on measured sensor stream data for many applications. For example, pressure sensors may be used in antilock braking systems (ABS), molding machines, compactors or hydraulic load-sensing systems, wherein a fine sensor accuracy may be important for the control cycle during wide sensor range. As another example, stream data may be monitored by a human to detect irregularities, for example, for immediate maintenance. However, if the streaming sensor data is incorrect or misleading, sensor data may lead to faulty deduced decisions, and thus, data quality restrictions in sensor data streams may benefit from a careful resolution. Thus, it may be desirable to provide techniques which may include data quality in data streams.

Further, management of large amounts of measurement data and data quality may result in significant overhead in storage and computing resources. Thus, it may be desirable to provide techniques for management of data quality in data streams and in relational metadata models.

SUMMARY

According to one general aspect, a system includes a data stream manager including a data receiver configured to obtain a first data stream interval including a first group of data items and a first aggregated data quality value associated with a quality of obtaining the first group of data items, each data item including one or more data attribute values, each data quality item including one or more data quality attribute values associated with one of the data items of the first group. The data stream manager may further include a data selection manager configured to select the first aggregated data quality value and a first indicator associating the first aggregated data quality value with the first group of data items, and to select the first group of data items, a data storage manager configured to store the first group of data items and the first indicator in a user table associated with a relational database, a system table manager configured to determine a data quality table associated with the user table based on an entry in a system table, and a data quality storage manager configured to store the first aggregated data quality value and the first indicator in the determined data quality table.

According to another aspect, a method includes obtaining a first data stream interval including a first group of data items and a first aggregated data quality value associated with a quality of obtaining the first group of data items, each data item including one or more data attribute values, each data quality item including one or more data quality attribute values associated with one of the data items of the first group. The first aggregated data quality value and a first indicator associating the first aggregated data quality value with the first group of data items may be selected. The first group of data items may be selected. The first group of data items and the first indicator may be stored in a user table associated with a relational database. A data quality table associated with the user table may be determined based on an entry in a system table. The first aggregated data quality value and the first indicator may be stored in the determined data quality table.

According to another aspect, a method includes requesting a first group of data items from a relational database. A first aggregated data quality value associated with a quality of obtaining the first group of data items and a first indicator associating the first aggregated data quality value with the first group of data items may be requested. The first group of data items may be retrieved from a user table associated with the relational database. A data quality table associated with the user table may be determined based on an entry in a system table. The first aggregated data quality value and the first indicator may be retrieved from the determined data quality table.

According to yet another aspect, a computer program product is tangibly embodied on a computer-readable medium and is configured to cause a data processing apparatus to obtain a first data stream interval including a first group of data items and a first aggregated data quality value associated with a quality of obtaining the first group of data items, each data item including one or more data attribute values, each data quality item including one or more data quality attribute values associated with one of the data items of the first group. The computer program product is further configured to select the first aggregated data quality value and a first indicator associating the first aggregated data quality value with the first group of data items. The computer program product is further configured to select the first group of data items. The computer program product is further configured to store the first group of data items and the first indicator in a user table associated with a relational database. The computer program product is further configured to determine a data quality table associated with the user table based on an entry in a system table, and store the first aggregated data quality value and the first indicator in the determined data quality table.

The details of one or more implementations are set forth in the accompanying drawings and the description below. Other features will be apparent from the description and drawings, and from the claims.

BRIEF DESCRIPTION OF THE DRAWINGS

FIG. 8 is a block diagram illustrating a data stream extract of a residual lifetime of a truck's engine from the beginning of the truck's lifetime.

FIG. 12 illustrates a SysQuality table schema according to an example embodiment.

FIG. 13 illustrates a DQ table schema according to an example embodiment.

DETAILED DESCRIPTION

Figure 1:
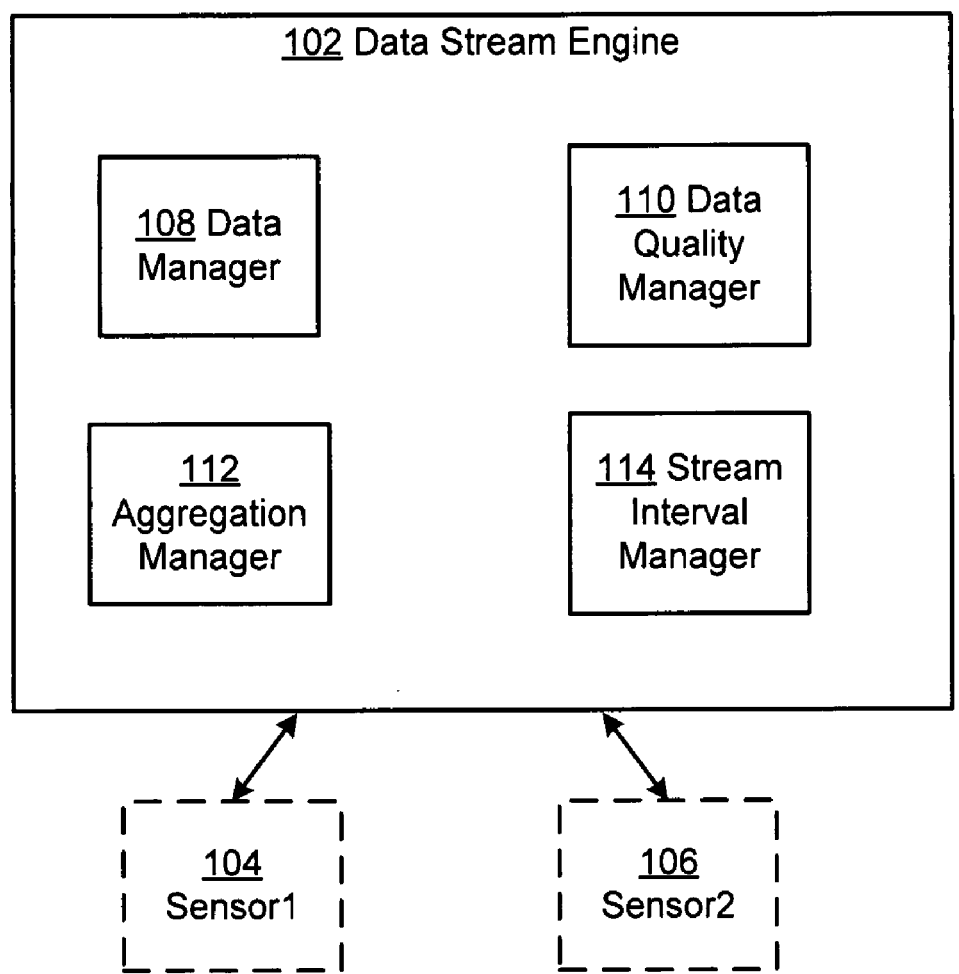
FIG. 1 is a block diagram of an example system for including data quality in data streams according to an example embodiment.

FIG. 1 is a block diagram of a system 100 for including data quality in data streams according to an example embodiment. In the example of FIG. 1, a data stream engine 102 may include various processing engines and managers that provide and perform processing of data and data quality items obtained from sensors 104, 106 for data streaming. The data stream engine 102 may include a data manager 108 configured to obtain a first group of data items, each data item including one or more data attribute values. For example, the data items may include quantifiable items that may be measured, for example, by the sensors 104, 106. For example, the data items may include measurements such as pressure or temperature. The data manager 108 may obtain values for the data items from the sensors 104, 106.

The data stream engine 102 may include a data quality manager 110 that may be configured to determine a first group of data quality items, each data quality item including one or more data quality attribute values associated with one of the data items of the first group. For example, the data quality items may include information regarding the quality of the measured data. For example, if the sensor 104 is functioning below a certain level, the quality of sensed data may be compromised, and the data quality items may include information indicating the quality of the sensed data as it is being obtained. For example, data quality items may include attributes such as accuracy and completeness to express the quality of the data items.

The data stream engine 102 may include an aggregation manager 112 that may be configured to determine a first aggregated data quality value based on the first group of data quality items. For example, several values obtained for a data item such as temperature may each have a data quality value associated with the data item. However, the data quality values may be aggregated, for example, by averaging the data quality values, or by finding the maximum or minimum value, to generate a single value representative of several values. This single value may be sent in a data stream with the data items to reduce the cost of streaming the data.

The data stream engine 102 may further include a stream interval manager 114 that may be configured to output a first data stream interval including the first group of data items and the first aggregated data quality value. For example, the first data stream interval may include five data items and one corresponding aggregated data quality item that describes the quality of the data items. The data items may be ordered in the first data stream interval, for example, by timestamp values associated with the time of obtaining the data items from the sensors 104, 106.

According to an example embodiment, the stream interval manager 114 may be configured to output a first jumping window including the first data stream interval including the first group of data items and the first aggregated data quality value. For example, the jumping window may not overlap with any other jumping window, or data stream interval.

According to an example embodiment, the data manager 108 may be configured to obtain a second group of data items, each data item including one or more data attribute values, the data quality manager 110 may be configured to determine a second group of data quality items, each data quality item including one or more data quality attribute values associated with one of the data items of the second group, the aggregation manager 112 may be configured to determine a second aggregated data quality value based on the second group of data quality items, and the stream interval manager 114 may be configured to output a second data stream interval including the second group of data items and the second aggregated data quality value. Thus, a second data stream interval may be prepared for insertion into the data stream.

According to an example embodiment, the stream interval manager 114 may be configured to output a first jumping window including the first data stream interval including the first group of data items and the first aggregated data quality value, and output a second jumping window including the second data stream interval including the second group of data items and the second aggregated data quality value, wherein the first jumping window and the second jumping window are nonoverlapping, and the data manager 108 may be configured to obtain the second group of data items immediately after the first group of data items is obtained. Thus, the data items are sent as they are obtained, and the jumping windows are nonoverlapping (e.g., they have no data items in common).

According to an example embodiment, the data manager 108 may be configured to obtain the second group of data items immediately after the first group of data items is obtained, and the first group of data items and the second group of data items are nonoverlapping. According to an example embodiment, the first group of data items may include an ordering of the data items of the first group. For example, the data items may be ordered according to the time they are obtained from the sensors 104, 106.

According to an example embodiment, the ordering of the data items of the first group may be based on an ordering of generation of the data attribute values included in the data items of the first group.

According to an example embodiment, the first group of data items may include attribute values associated with data sources. For example, the attribute values may include temperature, pressure, humidity, air pressure, etc.

According to an example embodiment, the first group of data items may include attribute values associated with sensor measurements. For example, the attribute values may include temperature, pressure, humidity, air pressure, etc.

According to an example embodiment, the first group of data items may include attribute values including one or more of a timestamp value, a pressure value, a temperature value, a light intensity value, a motion detection value, an air quality value, a location detection value, or a humidity detection value.

Figure 2:
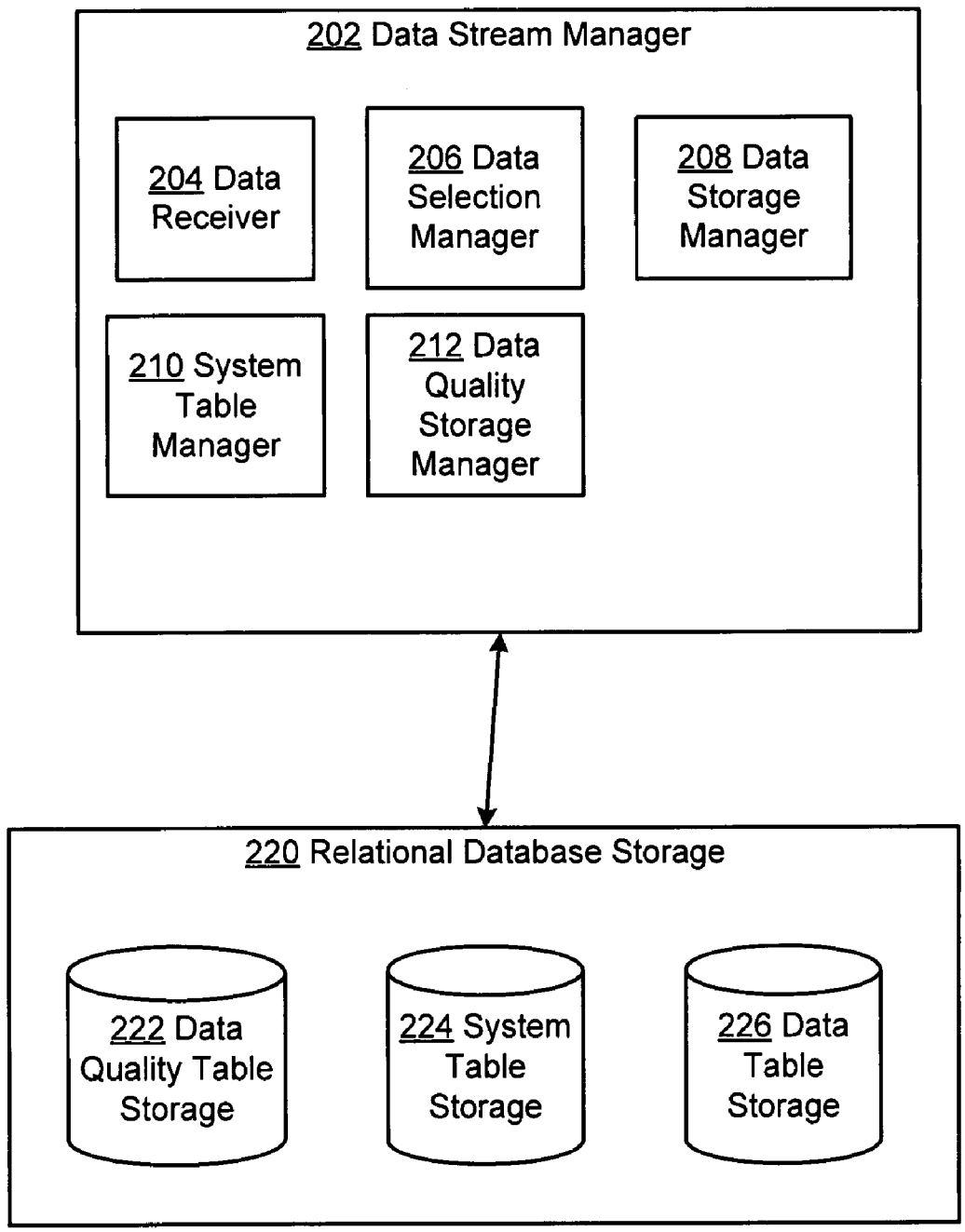
FIG. 2 is a block diagram of an example system for storing and managing data quality included in data streams according to an example embodiment.

FIG. 2 is a block diagram of a system 200 for managing data quality according to an example embodiment. In the example of FIG. 2, a data stream manager 202 may include various processing engines and managers that provide and perform processing of data and data quality items obtained from sensors 104, 106. According to an example embodiment, the data stream manager 202 may include a data receiver 204 configured to obtain a first data stream interval including a first group of data items and a first aggregated data quality value associated with a quality of obtaining the first group of data items, each data item including one or more data attribute values, each data quality item including one or more data quality attribute values associated with one of the data items of the first group. For example, the data receiver 204 may obtain the first data stream interval from a data stream received from the stream interval manager 114 discussed previously.

According to an example embodiment, the data stream manager 202 may include a data selection manager 206 configured to select the first aggregated data quality value and a first indicator associating the first aggregated data quality value with the first group of data items, and to select the first group of data items. For example, the data selection manager 206 may select the values from a data stream received from the stream interval manager 114 discussed previously.

According to an example embodiment, the data stream manager 202 may include a data storage manager 208 configured to store the first group of data items and the first indicator in a user table associated with a relational database. For example, the data storage manager 208 may store values for pressure and temperature and associated timestamp values in a user table of a relational database.

According to an example embodiment, the data stream manager 202 may include a system table manager 210 configured to determine a data quality table associated with the user table based on an entry in a system table. For example, the system table manager 210 may determine a data quality table for storing the aggregated data quality item associated with the first group of data items so that the values may be later retrieved in a meaningful way for analysis and processing.

According to an example embodiment, the data stream manager 202 may include a data quality storage manager 212 configured to store the first aggregated data quality value and the first indicator in the determined data quality table. For example, an aggregated accuracy value may be stored in a data quality table in association with the corresponding data item values.

According to an example embodiment, the first indicator may include a timestamp value indicating a time associated with a first data item collected for transmission in the first data stream interval. For example, if a jumping window has five data items and five corresponding timestamp values, then a first one of the timestamps may be used as an indicator of a beginning of the jumping window, thus delineating one jumping window from the next.

According to an example embodiment, the first indicator may include a timestamp value indicating a beginning of a jumping window included in the first data stream interval.

According to an example embodiment, the data storage manager 208 may be configured to store the first group of data items and timestamps associated with each data item in the first group in the user table associated with a relational database, wherein the timestamps include the first indicator.

According to an example embodiment, the determined data quality table may be associated with the user table based on a column identifier stored in a system table describing the determined data quality table and a column identifier stored in a system table describing tables including the user table and the determined data quality table associated with the relational database. For example, system tables of relational databases may contain information describing the tables of the database.

According to an example embodiment, the determined data quality table includes one or more columns configured to store attribute values associated with aggregated data quality values and a column identifier associated with an associated data item stored in the user table. For example, the tables of the example relational database may include attribute values and information for locating related information in other tables of the database.

According to an example embodiment, the data receiver 204 may be configured to obtain a second data stream interval including a second group of data items and a second aggregated data quality value associated with a quality of obtaining the second group of data items, each data item including one or more data attribute values, each data quality item including one or more data quality attribute values associated with one of the data items of the second group. According to an example embodiment, the data selection manager 206 may be configured to select the second aggregated data quality value and a second indicator associating the second aggregated data quality value with the second group of data items and to select the second group of data items.

According to an example embodiment, the data storage manager 208 may be configured to store the second group of data items and the second indicator in the user table.

According to an example embodiment, the system table manager 210 may be configured to determine the data quality table associated with the user table based on an entry in a system table. According to an example embodiment, the data quality storage manager 212 may be configured to store the second aggregated data quality value and the second indicator in the determined data quality table.

According to an example embodiment, the system 200 may include a relational database storage area 220 that may include a data quality table storage area 222 that may be configured to store data quality information, a system table storage area 224 that may be configured to store system table information, and a data table storage area 226 that may be configured to store data table information. For example, the data quality storage manager 212 may be configured to store data quality information in the data quality table storage area 222. For example, the data storage manager 208 may be configured to store data information in the data table storage area 222.

Example methods and systems are discussed herein for collecting, transmitting, and storing data and data quality information. For example, information regarding data quality may be collected from sensors and streamed along with data measured by the sensors to avoid inappropriate decisions that may result due to incomplete and/or incorrect data. Further, the information regarding data quality may be stored together with the captured sensor data in a target database so that evaluation of data with restricted quality may be performed.

As an example of a system of sensors, a hydraulic brake system of a truck may be equipped with pressure sensors to detect sudden pressure loss in case of a pipe rupture in order to send a warning to the driver. In this system, disregarding a restricted sensor precision could lead to a disaster. For example, a sensor may not detect a slow increase of pressure loss in the event of a small leak. Thus, during a hard brake, the system may burst and the truck driver may be unable to stop the vehicle.

A more complex system that may involve several dozen sensors may be used to forecast the residual lifetime of the engine of a vehicle such as a truck so that the maintenance of the truck may be optimized. However, if the durability of the truck is overestimated due to imprecise sensors, the truck may break down on the road and require an expensive towing.

Sensors may provide for automatic collection of large volumes of data. However, significant resource constraints may be posed by data streams (e.g., restricted processing power, memory and communication capacity). Thus, the largescale data may be reduced by data pre-processing. For example, raw sensor data may be combined, summarized and aggregated to reduce the data volume either without loss of information, or with an acceptable amount of lost information.

Data quality information may be propagated through the pre-processing steps similarly to the sensor data. However, the propagation of data quality information may result in overhead for data transfer and management, which may be significant for large amounts. Further, quality information may provide additional metadata on sensor data.

As discussed further below, jumping windows may be used for efficient collection and propagation of data quality in data stream environments. Further, an example metadata extension may be provided for the uniform modeling of very large numbers of data quality dimensions in data streams. As discussed further below, an example metadata model extension for a relational database schema may provide a means for storing and managing data quality information in a relational database management system (RDBMS). Further, as discussed below, an example mapping between the two metadata models may help to close the gap between a streaming system and a target database.

Data quality in databases may include dimensions such as accuracy and completeness. In determining data quality generally, a set of reference data sources containing the true data may be used to calculate the data quality. However, no such reference is present for sensor measurement data. Further, an estimation of data quality based on reference may be generated online during query processing. Thus, no persistent storage of data quality information may be addressed in such a scenario.

Quality of Service (QoS) may be an important issue in data stream management systems (DSMS). For example, a system may include QoS dimensions such as latency, importance and approximation of DSMS query processing.

As another example, a system may include a reliability-based QoS dimension latency combined with an uncertainty of workload information. However, these QoS dimensions characterize the service or processing quality of the DSMS, and may be used to drive policies for scheduling and load shedding, and thus, data quality restrictions due to sensor specifications may not be addressed in this context.

Due to restricted memory capacity, joins of data streams may be processed window-wise. Further, sequence matching may be evaluated in moving windows of two streams.

There are many environments in which sensors are used for measuring or detecting entities (e.g., temperature, pressure, motion, humidity). For example, a manufacturing area may be monitored with the aid of sensors. The measured sensor data may be streamed toward target applications, where the data may be processed, and decisions may be generated regarding actions to be taken. Generally, data processing may involve at least two modes. In a first mode data may be consumed directly from a data stream for basic data analysis in an automatic process control, for example, during production processes. In a second mode, business applications may require data spanning a wider time interval aggregated in a persistent database, and thus, complex data mining and knowledge discovery may be executed. Both of these scenarios may be supported by the example techniques discussed herein.

As discussed further below, example techniques for data quality transfer and management may include data quality recording, a DSMS extension for data quality propagation, a DBMS extension for persistent data quality storage and a metadata mapping for data quality import from a data stream into a database. During the data quality recording, data quality (DQ) information may be captured from a sensor.

Figure 3:
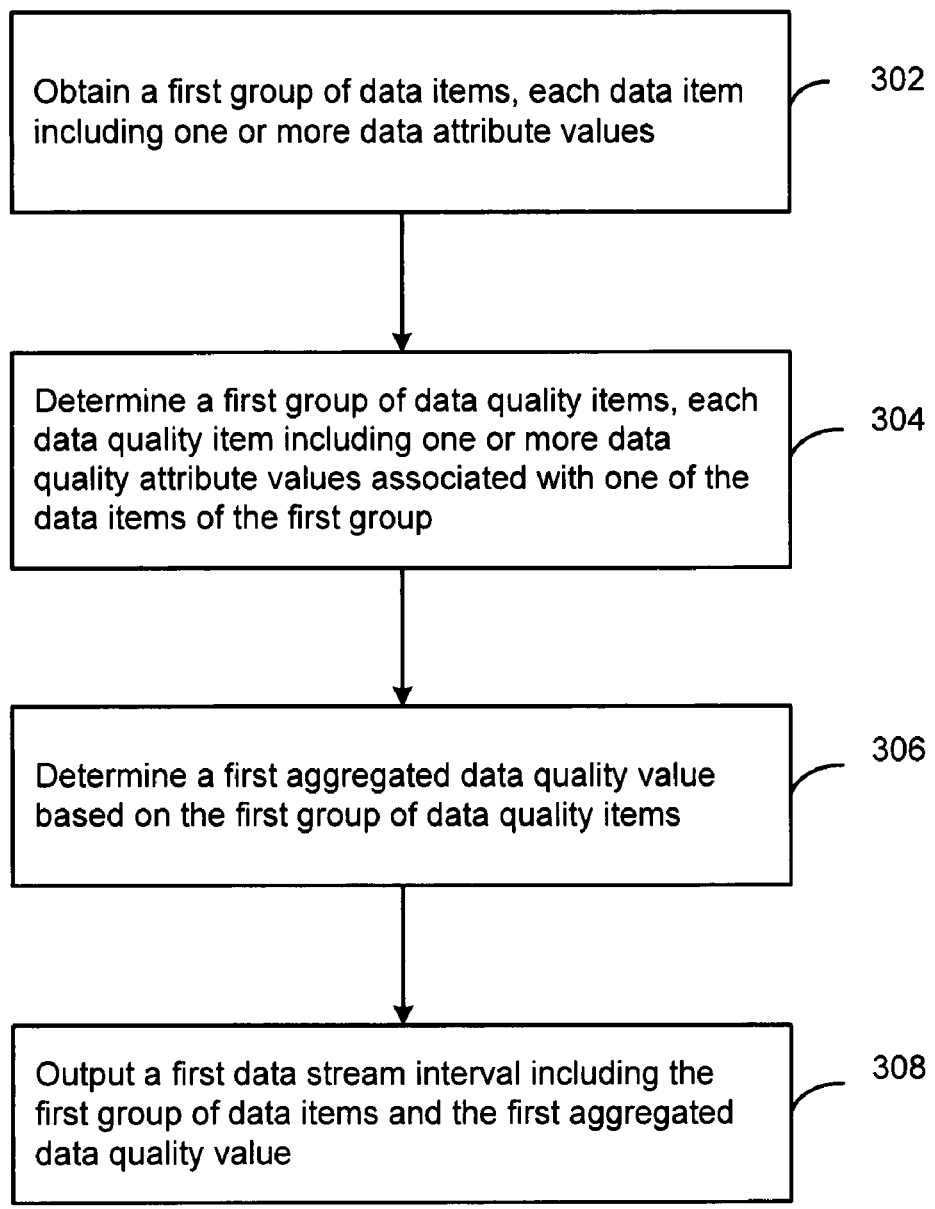
FIG. 3 is a flowchart illustrating an operation of the example system of FIG. 1.

FIG. 3 is a flowchart illustrating an example operation of the system of FIG. 1. According to an example embodiment, a first group of data items may be obtained, each data item including one or more data attribute values (302). For example, the data manager 108 may obtain the first group of data items, for example, from one of the sensors 104, 106. For example the data items may include values for pressure and temperature that may be measured by the sensors 104, 106.

According to an example embodiment, a first group of data quality items may be determined, each data quality item including one or more data quality attribute values associated with one of the data items of the first group (304). For example, the data quality manager 110 may obtain the first group of data quality items, such as accuracy and completeness values corresponding to the obtained data values.

According to an example embodiment, a first aggregated data quality value may be determined based on the first group of data quality items (306). For example, the aggregation manager 112 may generate an aggregated value such as an average value based on the first group of data quality items.

According to an example embodiment, a first data stream interval including the first group of data items and the first aggregated data quality value may be output (308). For example, the first data stream interval may include five data item values and five corresponding timestamp values, and one aggregated data quality value for each data quality attribute (e.g., one value for each of accuracy and completeness).

According to an example embodiment, outputting the first data stream interval may include outputting a first jumping window including the first data stream interval including the first group of data items and the first aggregated data quality value. For example, jumping windows may include nonoverlapping windows in data streams.

According to an example embodiment, a second group of data items may be obtained, each data item including one or more data attribute values, and a second group of data quality items may be determined, each data quality item including one or more data quality attribute values associated with one of the data items of the second group. According to an example embodiment, a second aggregated data quality value may be determined based on the second group of data quality items. According to an example embodiment, a second data stream interval including the second group of data items and the second aggregated data quality value may be output.

According to an example embodiment, outputting the first data stream interval may include outputting a first jumping window including the first data stream interval including the first group of data items and the first aggregated data quality value, and outputting the second data stream interval may include outputting a second jumping window including the second data stream interval including the second group of data items and the second aggregated data quality value. According to an example embodiment, the first jumping window and the second jumping window are nonoverlapping, and the second group of data items is obtained immediately after the first group of data items is obtained.

According to an example embodiment, outputting the first data stream interval may include outputting a first jumping window including the first data stream interval including the first group of data items and the first aggregated data quality value.

According to an example embodiment, a second group of data items may be obtained, each data item including one or more data attribute values.

According to an example embodiment, a second group of data quality items may be determined, each data quality item including one or more data quality attribute values associated with one of the data items of the second group, a second aggregated data quality value may be determined based on the second group of data quality items, and a second data stream interval including the second group of data items and the second aggregated data quality value may be output.

According to an example embodiment, the second group of data items may be obtained immediately after the first group of data items is obtained, and the first group of data items and the second group of data items are nonoverlapping.

According to an example embodiment, the first group of data items may include an ordering of the data items of the first group. For example, the data items may be ordered according to timestamp values associated with a time of measurement by the sensors 104, 106.

According to an example embodiment, the ordering of the data items of the first group may be based on an ordering of generation of the data attribute values included in the data items of the first group.

According to an example embodiment, the first group of data items may include attribute values associated with data sources. For example, the attribute values may include temperature and pressure.

According to an example embodiment, the first group of data items may include attribute values associated with sensor measurements. According to an example embodiment, the first group of data items may include attribute values including one or more of a timestamp value, a pressure value, a temperature value, a light intensity value, a motion detection value, an air quality value, a location detection value, or a humidity detection value.

According to an example embodiment, determining the first group of data quality items may include determining the first group of data quality items, each data quality item including data quality attribute values including one or more of a completeness value or an accuracy value.

According to an example embodiment, determining the first aggregated data quality value may include determining a first aggregated data quality value based on any aggregation function given by the application environment. For example, the aggregation function may determine a linear average value of data quality attribute values of the first group of data quality items, determine a squared average value of data quality attribute values of the first group of data quality items, determine a weighted squared average value of data quality attribute values of the first group of data quality items, determine a minimum value of data quality attribute values of the first group of data quality items, or determine a maximum value of data quality attribute values of the first group of data quality items. One skilled in the art of data processing will appreciate that there are many other such aggregation functions.

Figure 4:
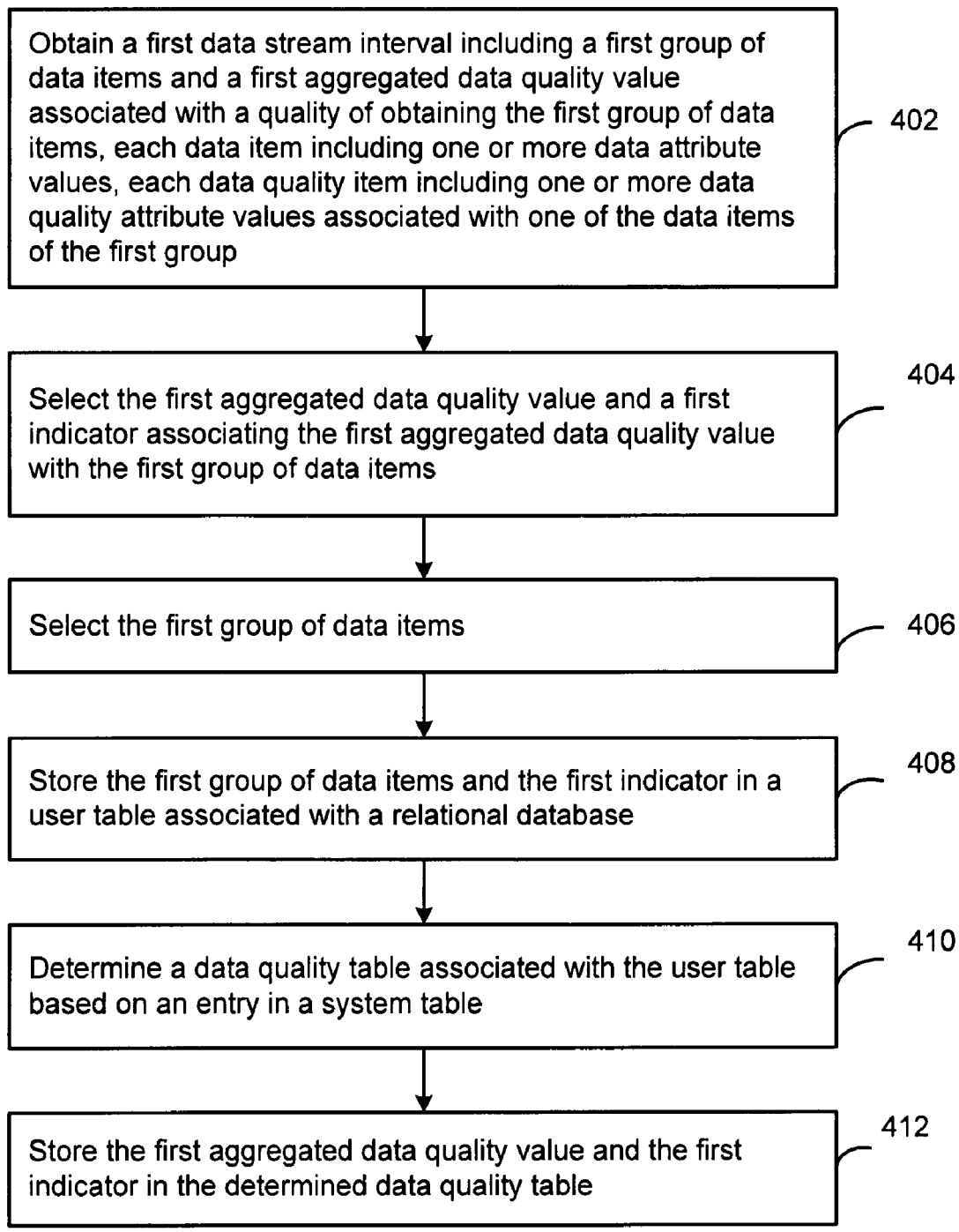
FIG. 4 is a flowchart illustrating an operation of the example system of FIG. 2.

FIG. 4 is a flowchart illustrating an example operation of the system of FIG. 2. According to an example embodiment, a first data stream interval including a first group of data items and a first aggregated data quality value associated with a quality of obtaining the first group of data items may be obtained, each data item including one or more data attribute values, each data quality item including one or more data quality attribute values associated with one of the data items of the first group (402). For example, the first data stream interval may be received by the data receiver 204 from the stream interval manager 114 discussed previously.

According to an example embodiment, the first aggregated data quality value and a first indicator associating the first aggregated data quality value with the first group of data items may be selected (404). For example, a beginning timestamp value indicating the beginning of a jumping window, and the first aggregated data quality value may be selected. According to an example embodiment, the first group of data items may be selected (406). For example, the data selection manager 206 may select the first group of data items, the first aggregated data quality value and the first indicator.

According to an example embodiment, the first group of data items and the first indicator may be stored in a user table associated with a relational database (408). For example, the first group of data items and the beginning timestamp indicating the beginning of the jumping window that transported the data items may be stored by the data storage manager 208 in a user table such as a user table stored in the data table storage area 226 discussed previously.

According to an example embodiment, a data quality table associated with the user table may be determined based on an entry in a system table (410). For example, the data quality table may be determined by the system table manager 210 based on a foreign key stored in a system table such as a system table stored in the system table storage area 224.

According to an example embodiment, the first aggregated data quality value and the first indicator may be stored in the determined data quality table (412). For example, an aggregated value of accuracy and the beginning timestamp value may be stored in the data quality table by the data quality storage manager 212.

According to an example embodiment, the first indicator may include a timestamp value indicating a time associated with a first data item collected for transmission in the first data stream interval. For example, the timestamp value may indicate the beginning of the stream of values transported in a particular jumping window, and may be used to locate the jumping window in the database tables in conjunction with a value indicating the number of data items included in the jumping window.

According to an example embodiment, the first indicator may include a timestamp value indicating a beginning of a jumping window included in the first data stream interval.

According to an example embodiment, the first group of data items and timestamps associated with each data item in the first group may be stored in the user table associated with a relational database, wherein the timestamps include the first indicator. For example, the first group may be stored in a user table stored in the data table storage area 226.

According to an example embodiment, the determined data quality table may be associated with the user table based on a column identifier stored in a system table describing the determined data quality table and a column identifier stored in a system table describing tables including the user table and the determined data quality table associated with the relational database. For example, the identifiers may include foreign keys pointing to the data quality table and to a column within the data quality table.

According to an example embodiment, the determined data quality table may include one or more columns configured to store attribute values associated with aggregated data quality values and a column identifier associated with an associated data item stored in the user table. For example, the columns may store aggregated data quality values for accuracy and completeness.

According to an example embodiment, a second data stream interval including a second group of data items and a second aggregated data quality value associated with a quality of obtaining the second group of data items may be obtained, each data item including one or more data attribute values, each data quality item including one or more data quality attribute values associated with one of the data items of the second group. The second aggregated data quality value and a second indicator associating the second aggregated data quality value with the second group of data items may be selected. The second group of data items may be selected. The second group of data items and the second indicator may be stored in the user table. The data quality table associated with the user table may be determined based on an entry in a system table. The second aggregated data quality value and the second indicator may be stored in the determined data quality table.

According to an example embodiment, a first jumping window including the first data stream interval including the first group of data items and the first aggregated data quality value may be obtained, a second jumping window including the second data stream interval including the second group of data items and the second aggregated data quality value may be obtained, the first jumping window and the second jumping window may be nonoverlapping, and the second group of data items may be obtained immediately after the first group of data items is obtained.

According to an example embodiment, the second group of data items may be obtained immediately after the first group of data items is obtained, and the first group of data items and the second group of data items may be nonoverlapping.

According to an example embodiment, the first group of data items may include attribute values associated with data sources.

According to an example embodiment, the first group of data items may include attribute values associated with sensor measurements.

According to an example embodiment, the first group of data items may include attribute values including one or more of a timestamp value, a pressure value, a temperature value, a light intensity value, a motion detection value, an air quality value, a location detection value, or a humidity detection value.

Figure 5:
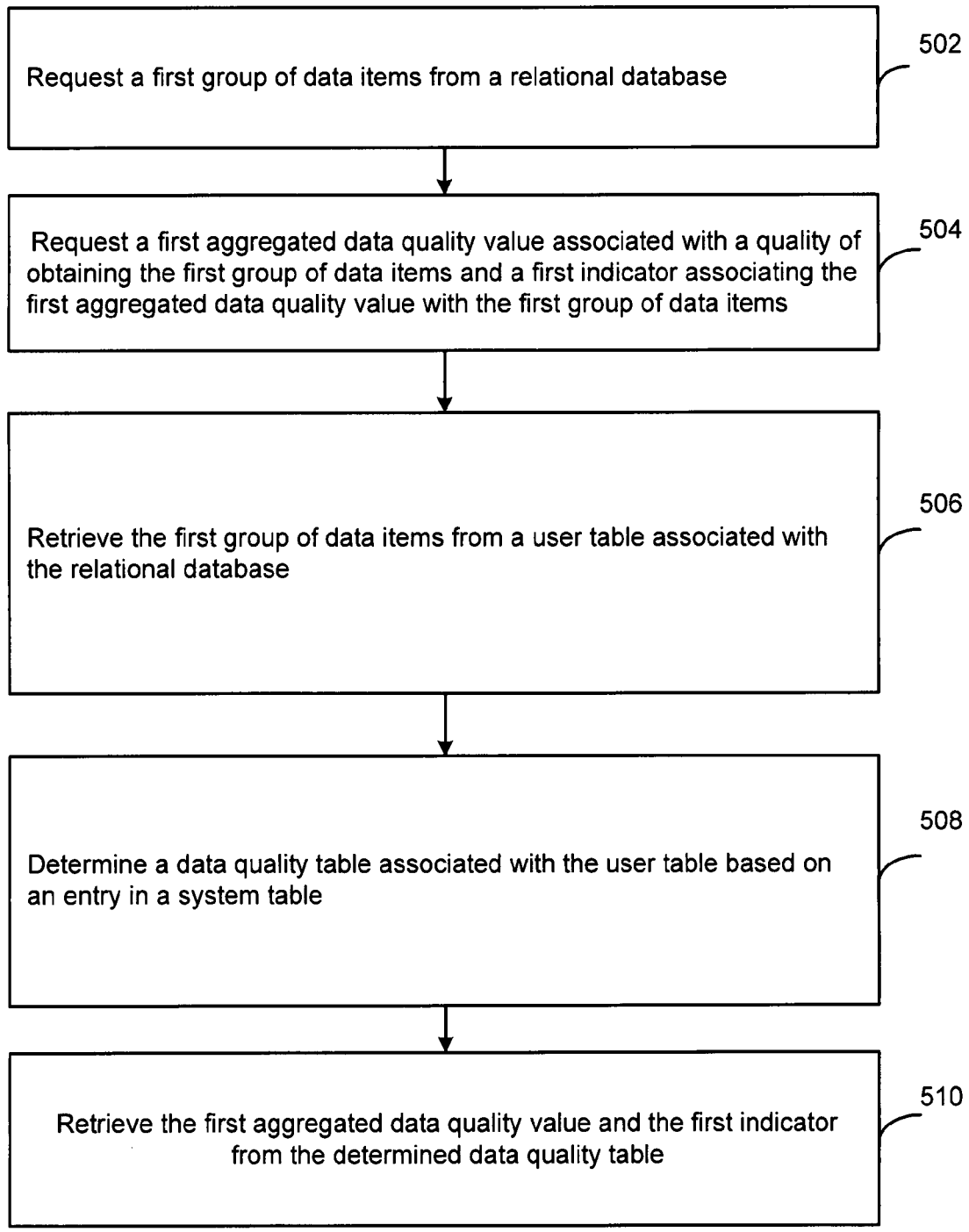
FIG. 5 is a flowchart illustrating an operation of the example system of FIG. 2.

FIG. 5 is a flowchart illustrating an example operation of the system of FIG. 2. According to an example embodiment, a first group of data items may be requested from a relational database (502). For example, the first group of data items may be requested by the system table manager 210.

According to an example embodiment, a first aggregated data quality value associated with a quality of obtaining the first group of data items and a first indicator associating the first aggregated data quality value with the first group of data items may be requested (504). For example, the first aggregated data quality value and the first indicator may be requested by the system table manager 210.

According to an example embodiment, the first group of data items may be retrieved from a user table associated with the relational database (506). For example, the first group of data items may be retrieved from the data table storage area 226 by the data storage manager 208.

According to an example embodiment, a data quality table associated with the user table may be determined based on an entry in a system table (508). For example, a data quality table may be determined by the system table manager 210.

The first aggregated data quality value and the first indicator may be retrieved from the determined data quality table (510). For example, the first aggregated data quality value and the first indicator may be retrieved by the data quality storage manager 212 from a data quality table stored in the data quality table storage area 222.

Figure 6:
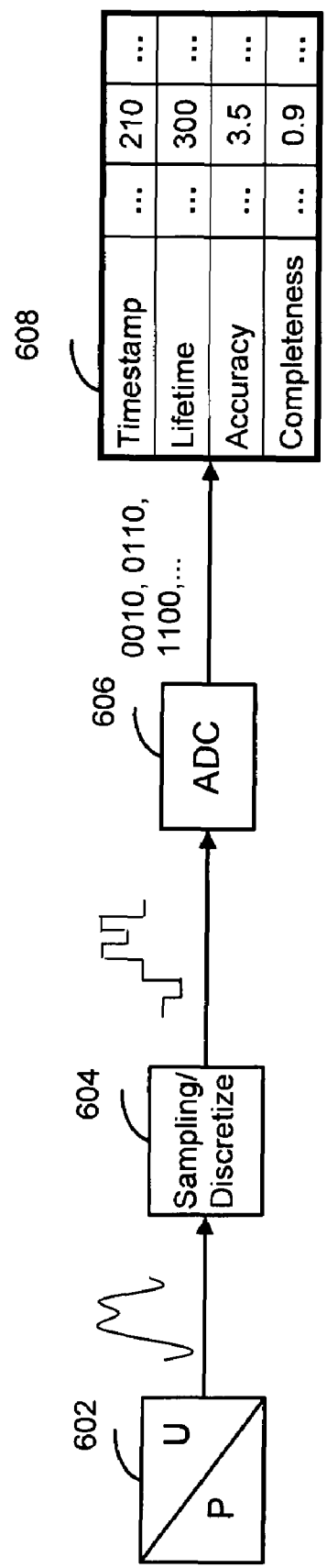
FIG. 6 is a block diagram of a processing of output from a sensor according to an example embodiment.

FIG. 6 is a block diagram of a processing of output from a sensor according to an example embodiment. As shown in FIG. 6, a sensor 602 may output data such as measurement data and data quality information. The output of the sensor 602 may be sampled and discretized 604 to provide a discretized and digitized data signal representing the measured physical values, which may pass through an analog-to-digital converter 606 before being introduced into a data stream 608. The characteristics of the sensor 602 may define the data quality dimensions of the outgoing data stream, for example, accuracy and completeness. For example, accuracy may describe the numerical precision of a data value, and may be indicated as an absolute or relative error of a physical value. The accuracy of a sensor may be provided by the measurement precision class in a manufacturer's technical specification. For example, the data quality completeness may address the problem of missing values due to sensor failures or malfunctions. As an example, estimation or interpolation of missing values may be used for missing values. The data quality dimension completeness may help to distinguish between measured data items and estimated or interpolated items. The sampling rate of the discretization may define a stream rate r (e.g., 100/s, 1/10 min), which may determine the stream length m dependent on the time t and thus may serve as a reference for the stream completeness c, as shown below.

$$c = 1 - \text{count(missingvalues)}/m \quad (1)$$

$$c = 1 - \text{count(missingvalues)}/r*t \quad (2)$$

Figure 7:
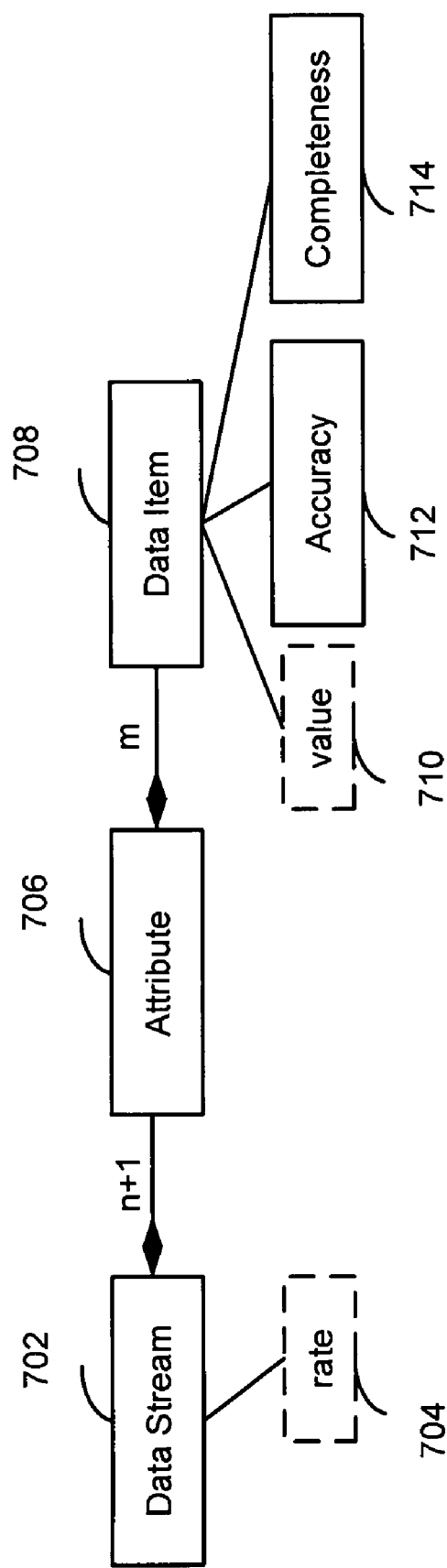
FIG. 7 illustrates a data quality annotation according to an example embodiment.

FIG. 7 illustrates a data quality annotation according to an example embodiment. One example approach to data quality annotations may include streaming the data quality information for each data quality (DQ) dimension with the same stream rate as the measurement stream as shown in FIG. 7. The data item may be defined by its numerical values, and further described by its DQ information. For example, a data stream 702 may be streamed at rate 704, and may include n+1 attributes 706 and m data items 708 which may include a value 710, an accuracy 712, and a completeness 714.

An example sensor data stream D of length m and rate r may include n+1 attributes $A_i$ ($0 \leq i \leq n$), wherein $A_0$ represents a timestamp t associated with the sensor data stream. Each timestep $t_j$ ($0 \leq j \leq m$) may indicate a tuple $T_j$ with n measurement values $v_{ij}$.

One example of DQ annotations may enhance every measurement value $v_{ij}$ with a data quality vector $\vec{q}_{ij}$ enclosing d data quality dimensions (e.g., accuracy $a_{ij}$ and completeness $c_{ij}$) as shown below.

$$v'_{ij} = \{v_{ij}, \vec{q_{ij}}\} \quad (3)$$

$$\vec{q_{ij}} = \begin{pmatrix} a_{ij} \\ c_{ij} \end{pmatrix} \quad (4)$$

FIG. 8 is a block diagram illustrating a data stream extract of a residual lifetime of a truck's engine from the beginning of the truck's lifetime. As shown in FIG. 8, a residual lifetime 802 may be estimated every ten days, as shown by timestamp values 804 (e.g., 210, 220, etc.). The residual lifetime 802 may be calculated based on several sensors (e.g., oil pressure, oil temperature, mileage, number of coldstarts) with the example data quality dimensions accuracy 806 and completeness 808. Similarly to the sensor measurements, the data quality information associated with the sensors may be combined and aggregated to generate the quality of the residual lifetime 802.

This example approach may significantly increase the data volume, which may be multiplied by the number of DQ dimensions considered. The additional data volume S to transfer data quality may results in S=m*n*d. Hence, this example approach may not be suitable for applications with stringent resource constraints and may be employed when communication costs for data transmission are not significant.

Therefore, jumping data quality windows may help reduce the additional data volume to transfer data quality information in a data stream. The example techniques discussed further below may provide flexibility, represented by a virtually unlimited number of supported DQ dimensions, a variable window size and adaptable aggregation functions to summarize the window data quality.

For example, jumping DQ windows may be provided in a data stream metamodel. Thus, an example DSMS metadata model may be extended. An example sensor data stream D may include n attributes $A_i$ ($1 \leq i \leq n$) representing sensor measurements. In an example metadata model, each attribute $A_i$ may be associated with virtually any number of data value items $v_{ij}$.

Figure 9:
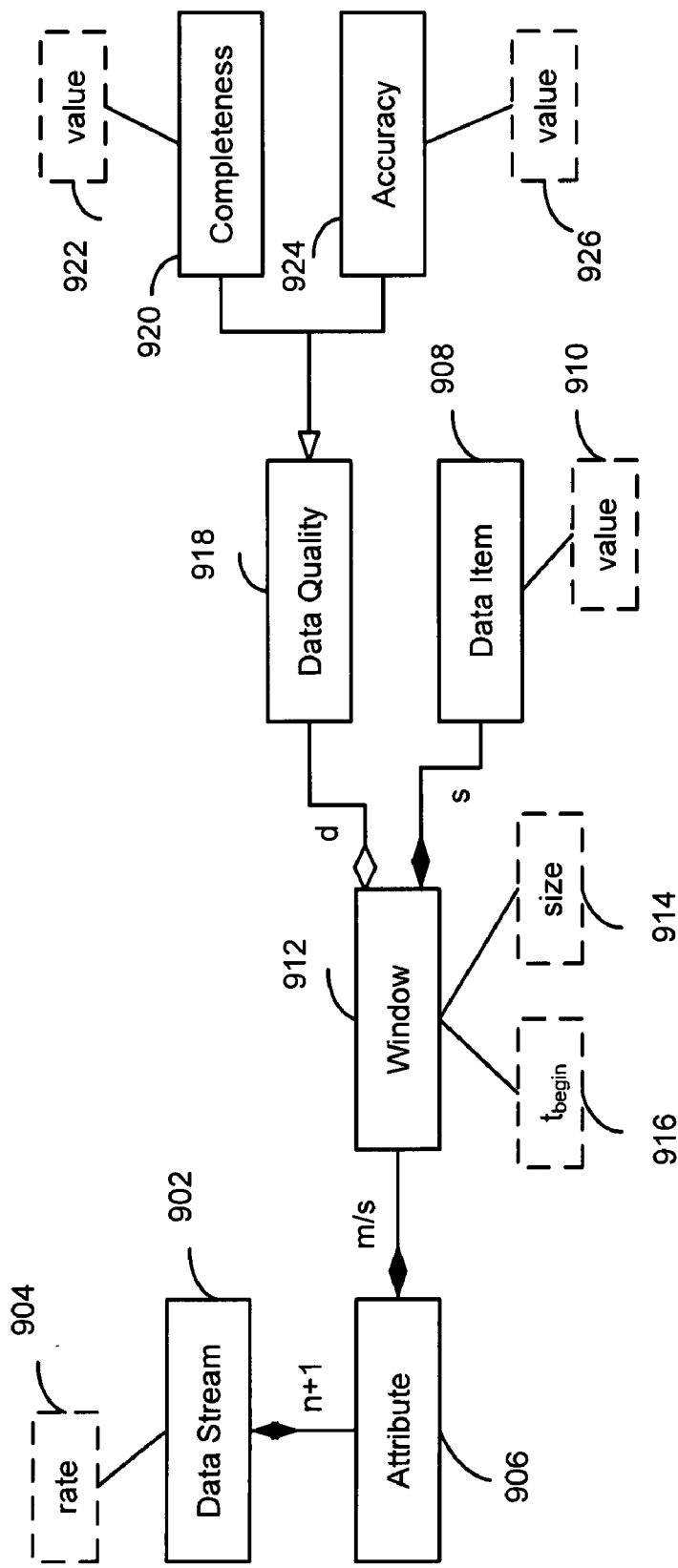
FIG. 9 is a block diagram illustrating a model of a data stream according to an example embodiment.

FIG. 9 is a block diagram illustrating a model of a data stream according to an example embodiment. As shown in FIG. 9, a data stream 902 may be streamed at rate 904, and may include n+1 attributes 906 and data items 908 of size s, which may include a value 910. An example jumping window 912 may be interposed in the relation between the attribute 906 and the data item 908 as shown in FIG. 9. Each measurement attribute stream may be parted into windows 912 with a predetermined size 914 including sensor data items and data quality information. Each window 912 may be identified by its starting point $t_{begin}=t_k$ (916). Each window 912 may include s measurement values $v_{ij}$ ($k \leq j \leq k+s-1$) of an example attribute $A_i$. Additionally, each window 912 may include one value for each data quality (DQ) dimension (918) $q_{ik}$ (e.g., window completeness $c_{ik}$ (920) having value 922 and window accuracy $a_{ik}$ (924) having value 926).

The number of data quality dimensions may be variable for each example attribute. Further, the window size s may be defined independently for each example stream attribute. The additional memory space to cover $d_i$ data quality dimensions for each of n attributes Ai may depend on the attributes' window size $s_i$ and the stream length m as shown below.

$$S = m * \sum_{i=1}^{n} \frac{d_i}{s_i} \quad (5)$$

For the jumping window based annotations, the data quality information may not be sent together with every single data item but may instead be sent window-wise for each DQ dimension. The additional data volume may thus be reduced by aggregating the data quality for each attribute $A_i$ ($1 \leq i \leq n$) in jumping stream windows $w_{ik}$ of the predetermined size $s_i$ starting at timestamp $t_{begin}=t_{ik}$. Thus, the aggregation functions may be flexibly determined for each DQ dimension corresponding to the underlying application. According to an example embodiment, the attribute $A_0$ may represent the timestamp, and not a sensor measurement, and thus may not be include data quality information.

The example definitions shown below may hold for each attribute $A_i$. Windows $w_{ik}$ may be referred to as windows $w_k$ of size s, etc.

$$w_k = \{v_{ij}, \vec{q_k} | k \leq j \leq k+s-1\} \quad (6)$$

$$\vec{q_k} = f(\vec{q_j} | k \leq j \leq k+s-1) \quad (7)$$

The window $w_k$ may include s sensor data items $v_{ij}$ as well as the data quality vector $\vec{q_k}$ describing d data quality dimensions. The vector $\vec{q_k}$ may represent the aggregated data quality information $\vec{q_j}$, which may be associated with each data item. The vector function f may incorporate aggregation functions $f_l$ ($1 \leq l \leq d$) for all enclosed data quality dimensions.

In the equations shown below, a data quality vector is shown for d=2, including a window accuracy $a_k$ and window completeness $c_k$.

$$\vec{q_k} = \begin{pmatrix} a_k \\ c_k \end{pmatrix} \quad (8)$$

$$a_k = f_a(a_j | k \leq j \leq k+s-1) \quad (9)$$

$$c_k = f_c(c_j | k \leq j \leq k+s-1) \quad (10)$$

As shown above, an accuracy aggregation function $f_a$ may not be fixed, but may instead be adjusted to an application's requirements. The example metadata model may be configured to be as generic as possible to be adaptable for many different use cases. For example, the example window accuracy $a_k$ may be calculated as a (weighted) linear or squared average, or as a maximum or minimum of the accuracies $a_j$ of the data items accuracies in the corresponding data stream window. One skilled in the art of systematic and statistical error propagation will appreciate that there are many different ways to determine an aggregation function.

As an example, a linear average may be used to calculate the accuracy of the example truck engine's residual lifetime. An example function $f_c$ to compute the window completeness $c_k$ may be determined as a ratio of originally measured sensor data items (e.g., non-null values) to the window size s, or $f_c = \text{sum}(c_j)/s$.

Figure 10:
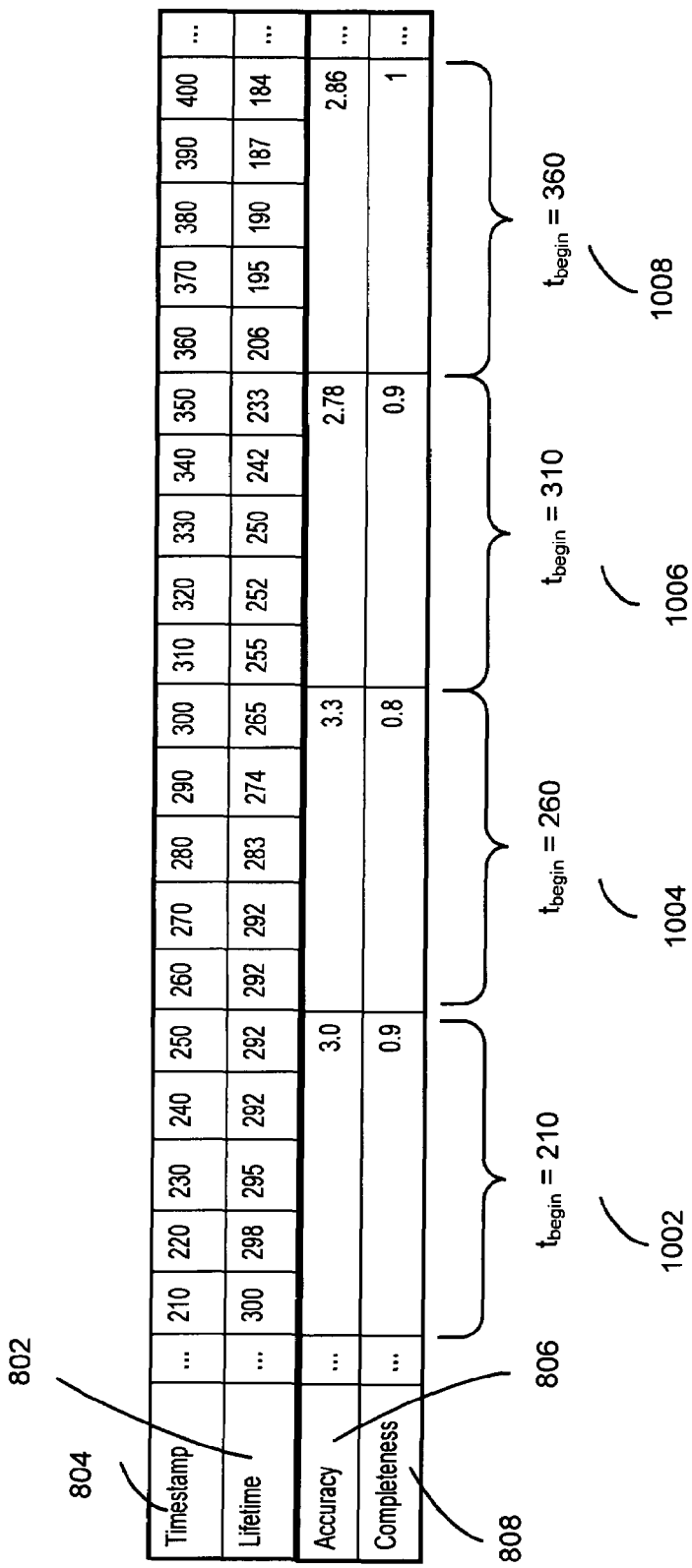
FIG. 10 illustrates example data stream values in jumping windows according to an example embodiment.

FIG. 10 illustrates example data stream values in jumping windows according to an example embodiment. The values shown in FIG. 10 indicate the resulting data quality for the residual lifetime of the truck engine. As shown in FIG. 10, the DQ information such as accuracy 806 and completeness 808 provided for each data item of FIG. 8 is aggregated in jumping windows 1002, 1004, 1006, 1008 of size s=5, thus saving resources involved in transmission, storage, and maintenance of the data stream.

The calculation of the data quality dimensions for each window may be executed at an embedded intelligent device to which the sensor may be connected, or at any other point in the data stream system. According to an example embodiment, the DQ aggregation may be performed as close to the sensor as possible, for better efficiency.

Once the data and data quality information sent in the data stream has been received, it may be stored in a storage device such as a relational database. As discussed below, an extension of an example relational metadata model may be provided for efficient storage of the data quality information in a persistent database. Thus, data quality may be considered as a dimension in an example relational metamodel.

According to an example embodiment, every column in a relational table may be enhanced with d data quality characteristics, or DQ dimensions. According to an example embodiment, in order to maintain the jumping window model of the data stream discussed above, data quality information may not stored in the database for every measurement value $v_{ij}$. Thus, an example database table containing sensor data may be partitioned into relation windows similarly to the jumping windows associated with the data stream.

Figure 11:
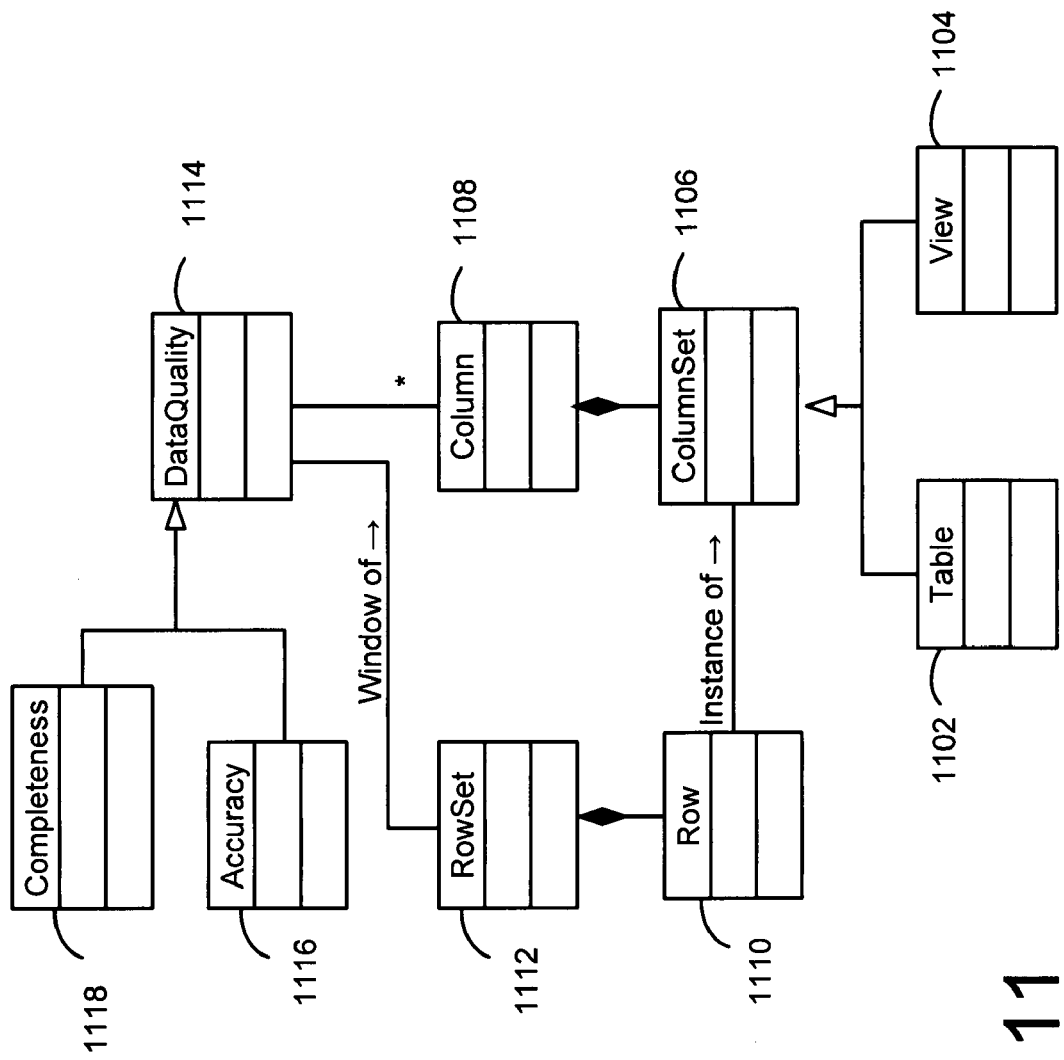
FIG. 11 illustrates a relational metamodel extension according to an example embodiment.

FIG. 11 illustrates a relational metamodel extension according to an example embodiment. The example relational metamodel extension of FIG. 11 is illustrated in the notation of the Object Management Group (OMG) standard Common Warehouse Model (CWM). As shown in FIG. 11, a Table 1102 or View 1104 may be generated as a ColumnSet 1106 of a predetermined number of Columns 1108, describing the table or view attributes. A Row 1110 may represent an instance of a ColumnSet 1106, including the inserted data values. An example relational window to manage data quality information may be configured as a RowSet 1112 for storing the sensor data associated with an example time interval. The Data Quality 1114 associated with an example Column 1108 may be stored in reference to example RowSets 1112 of the corresponding ColumnSet 1106. Example data quality dimensions for the metamodel of FIG. 11 include Accuracy 1116 and Completeness 1118.

For the management of data quality in a relational database a system table or catalog table SysQuality may be included in the catalog of the DBMS. FIG. 12 illustrates a SysQuality table schema according to an example embodiment. Further, an example table type, a data quality (DQ) table, may store DQ information. FIG. 13 illustrates a DQ table schema according to an example embodiment.

As shown in FIG. 12, the example SysQuality table may include a column QualityID 1202 for storing an identifier of an item of data quality information, a dimension 1204 column for storing an indicator of a data quality dimension (e.g., accuracy, completeness, etc.), and a DQTable 1206 column for storing a foreign key value as a pointer to a table wherein data quality information is stored. A MeasColumn 1208 column may store a foreign key referencing a column storing the measurement values., and a WindowSize 1210 column may store a value indicating a size of a data quality window associated with an incoming data stream.

An example DQ table describing the data quality of the measurements described in the schema of the table type shown in FIG. 13 may be generated automatically as a relational user table for storing measurement data. As shown in FIG. 13, the DQ table may include a Column 1302 storing a foreign key pointing to the sensor data column, a T_Begin 1304 column storing an indicator of a start timestamp associated with a data quality window, an Accuracy 1306 column storing a value indicating an accuracy associated with the values of the data quality window, and a completeness 1308 column storing a value indicating a completeness associated with the values of the data quality window. The example DQ table as shown in FIG. 13 may be easily extended to large numbers of data quality dimensions, depending on the user requirements and/or availability of data quality information.

Figure 14:
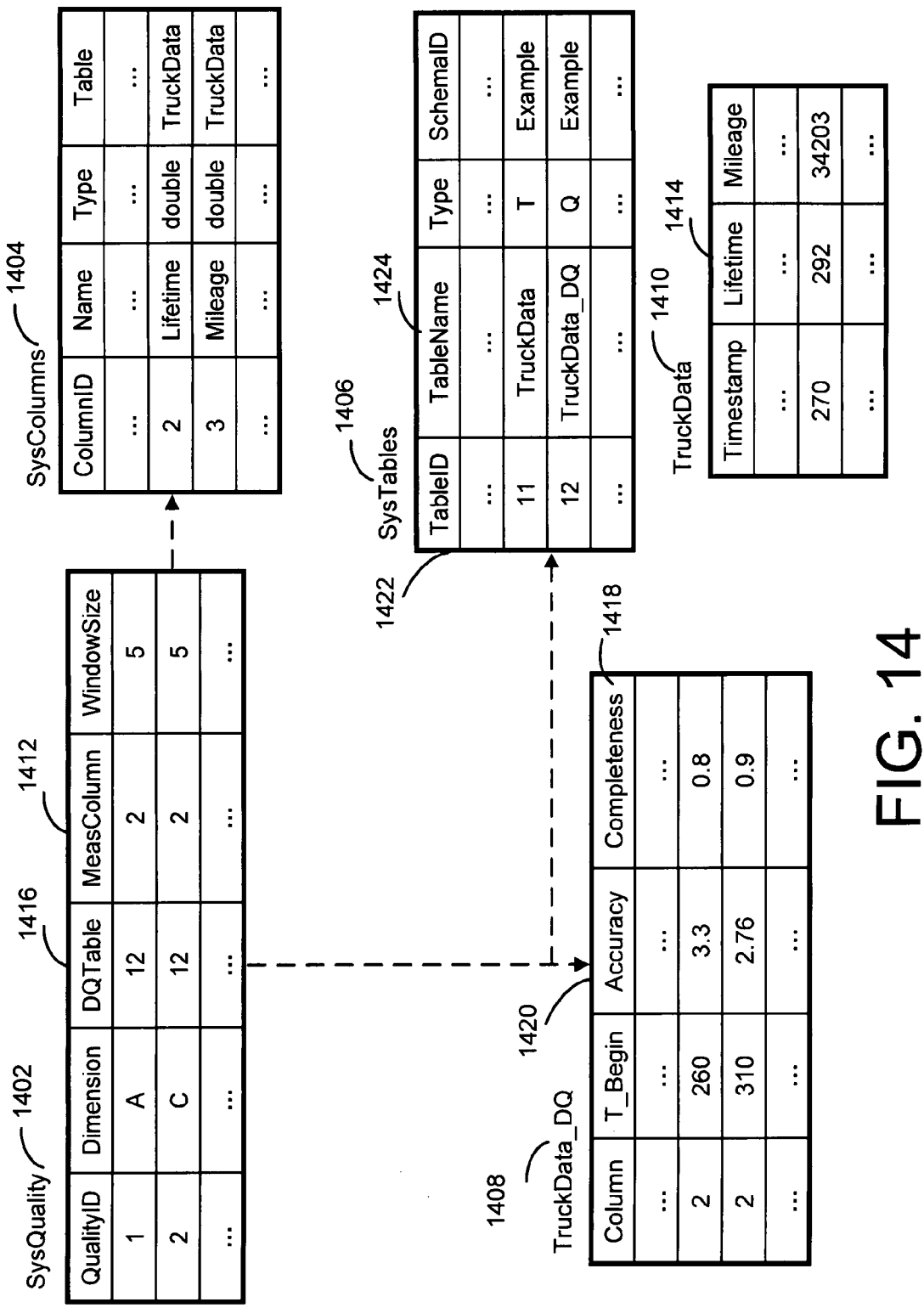
FIG. 14 illustrates system, data, and data quality tables according to an example embodiment.

FIG. 14 illustrates system, data, and data quality tables according to an example embodiment. As shown in FIG. 14, the system tables may include a SysQuality 1402 table, a SysColumns 1404 table, and a SysTables 1406 table. A TruckData_DQ 1408 table may store DQ data, and a TruckData 1410 may store data items such as sensor data. Thus, the example tables may be filled with measurement and quality data in accordance with the truck example discussed previously.

As shown in the example of FIG. 14, a column SysQuality.MeasColumn 1412 may reference an ID of a user table column where the measurement data is stored. For example, a SysQuality.MeasColumn 1412 value of 2 may reference a Lifetime 1414 column of the TruckData 1410 table. An example SysQuality.DQTable 1416 column may reference the DQ table TruckData_DQ 1408. For example, a SysQuality.DQTable 1416 value of 12 may reference corresponding values of the data quality dimensions completeness 1418 and accuracy 1420 for each window starting at T_Begin, via a value of 12 stored in a SysTables.TableID 1422 column. Further, the tables TruckData 1410 and TruckData_DQ 1408 may also be referenced by the system table SysTables 1406, via a SysTables.TableName 1424 column. Thus, data quality information may be consistently integrated and managed in relational databases.

According to an example embodiment, the jumping windows of the DSMS metadata model discussed previously may be mapped to the relation windows of the DBMS metadata model. As discussed below, one example additional insert operation per window may transfer the data quality information from the data stream into the target database.

Figure 15:
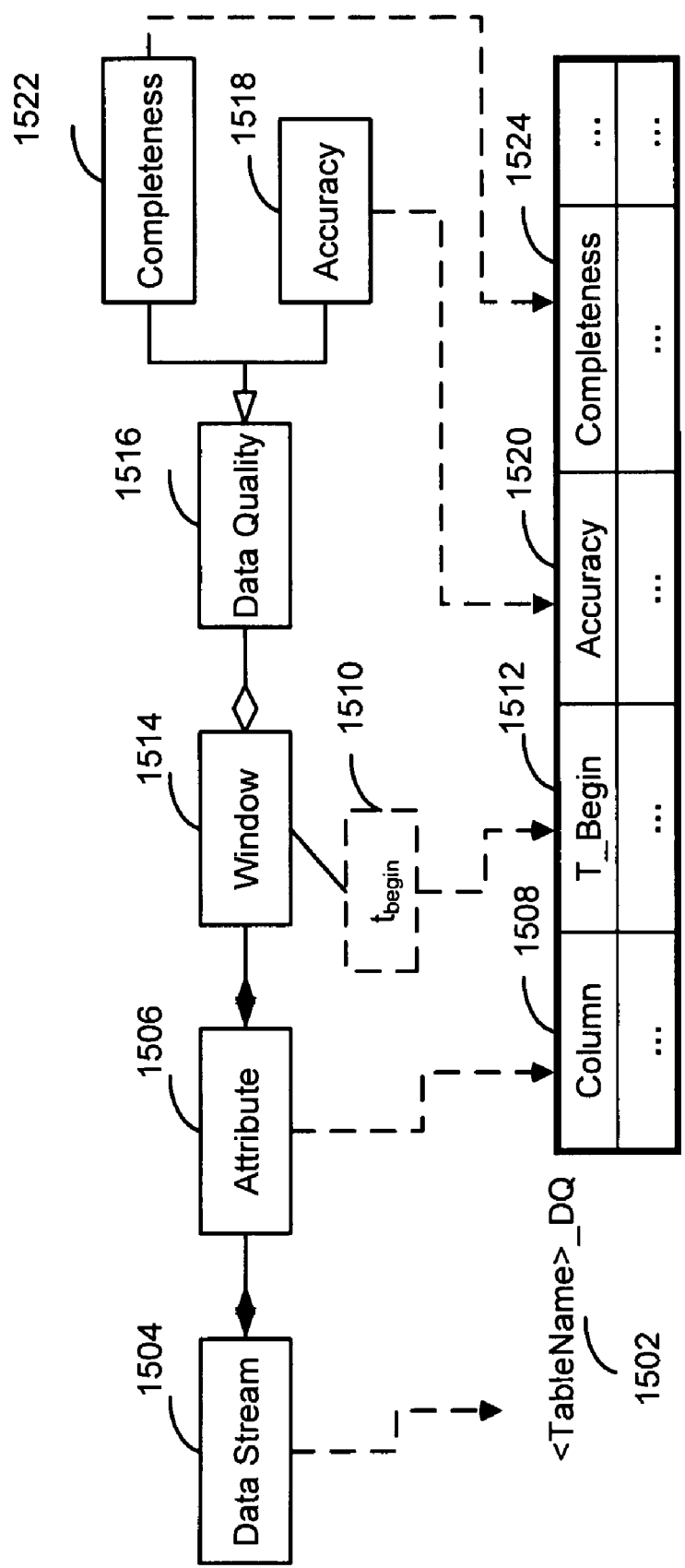
FIG. 15 illustrates a metadata mapping of the data quality information from the data stream into the target database according to an example embodiment.

FIG. 15 illustrates a metadata mapping of the data quality information from the data stream into the target database according to an example embodiment. As shown in the example of FIG. 15, components of the data stream metadata model may refer to the respective columns in a DQ table such as a DQ table 1502. For each incoming data stream 1504, a DQ table 1502 may be created and named according to measurements included in the data stream. For example, the streaming attributes 1506 may be reflected in a Column 1508. An example starting point T_Begin 1510, 1512 may identify a corresponding window 1514 such as a data quality 1516 window including Accuracy 1518, 1520 and Completeness 1522, 1524.

Figure 16:
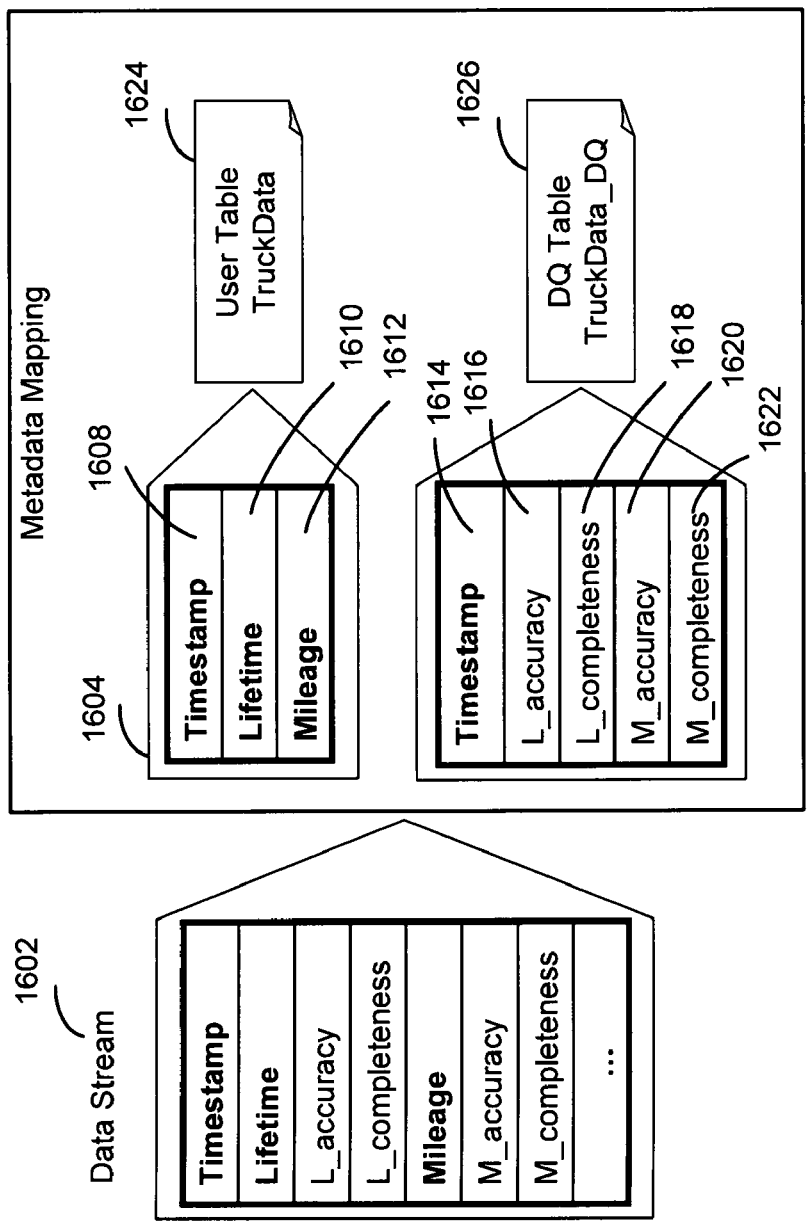
FIG. 16 illustrates an example metadata mapping scenario.

FIG. 16 illustrates an example metadata mapping scenario. For example, a data stream 1602 may be split into sensor data 1604 and quality data 1606, for example the data stream may be split into sensor data items Timestamp 1608, Lifetime 1610, and Mileage 1612, and into quality data items Timestamp 1614, Lifetime accuracy 1616, Lifetime completeness 1618, Mileage accuracy 1620, and Mileage completeness 1622, corresponding to the Timestamps 1608, 1614. The example sensor data 1604 may then be stored in a corresponding user table 1624. One relation tuple including all measurement attributes may be generated for each incoming stream tuple 1602. The example jumping stream windows may then be mapped to the relational windows of the database.

Example DQ tables 1626 may be generated to provide window-wise storage of data quality dimensions such as accuracy and completeness.

Hence, the example data quality information Timestamp 1614, Lifetime accuracy 1616, Lifetime completeness 1618, Mileage accuracy 1620, and Mileage completeness 1622 may be written to a respective data quality table 1626 for each window starting at a value $t_{begin}$ as discussed previously with regard to FIG. 10. Each attribute window may generate d entries, one for each data quality dimension. Thus, for n incoming attribute windows, n*d insert operations may be executed for storing entries in tables. According to an example embodiment, if information on an example data quality dimension is not streamed along with the data, the missing DQ values may be represented by null-values.

Figure 17:
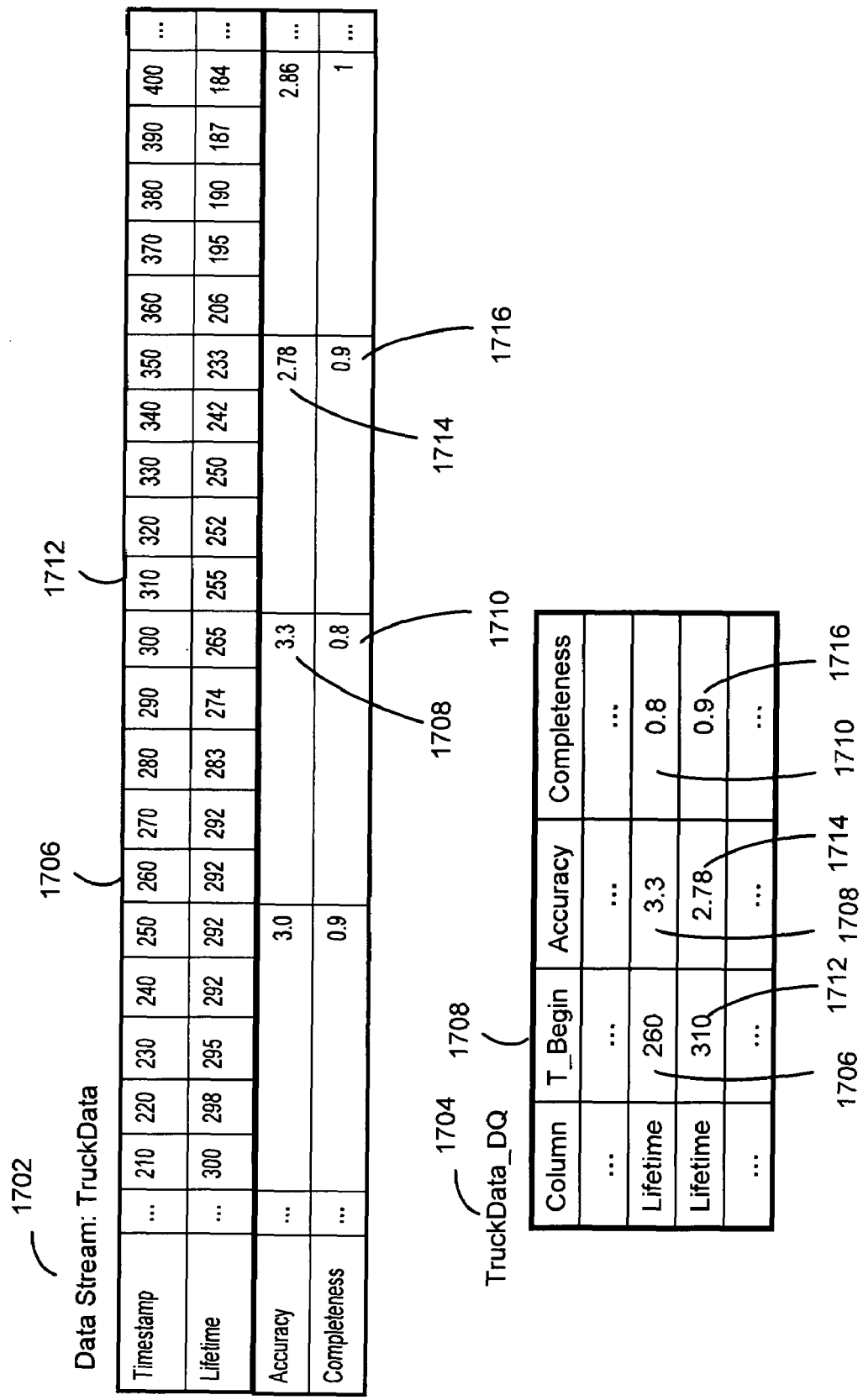
FIG. 17 illustrates an example mapping according to an example embodiment.

FIG. 17 illustrates an example mapping for the truck example discussed previously. A data stream 1702 for truck data may be received and data quality information describing the lifetime of a truck may be inserted into a quality table TruckData_DQ 1704. As shown in the example of FIG. 17, a timestamp value of 260 (1706) is shown as a first timestamp value in a jumping window in the data stream 1702. The Timestamp value 260 (1706) may be stored in a T_Begin column 1708 describing the lifetime of the truck. An accuracy value 3.3 (1708) may be stored as an accuracy value for the same row as the timestamp value 260 (1706), as the accuracy value 3.3 (1708) represents the aggregated value of the sensor accuracy for the jumping window having a $t_{begin}$ value of 260 (1706). Further, a completeness value 0.8 (1710) may be stored as a completeness value for the same row as the timestamp value 260 (1706), as the completeness value 0.8 (1710) represents the aggregated value of the sensor completeness for the jumping window having a $t_{begin}$ value of 260 (1706).

Additionally, a timestamp value of 310 (1712) is shown as a first timestamp value in a next jumping window in the data stream 1702. The Timestamp value 310 (1712) may be stored in the T_Begin column 1708. An accuracy value 2.78 (1714) may be stored as an accuracy value for the same row as the timestamp value 310 (1712), as the accuracy value 2.78 (1714) represents the aggregated value of the sensor accuracy for the jumping window having a $t_{begin}$ value of 310 (1712). Further, a completeness value 0.9 (1716) may be stored as a completeness value for the same row as the timestamp value 310 (1712), as the completeness value 0.9 (1716) represents the aggregated value of the sensor completeness for the jumping window having a $t_{begin}$ value of 310 (1712).

The example techniques discussed herein may include a mapping structure that may model a transfer from a data stream management system (DSMS) to a database management system (DBMS). According to an example embodiment, automatic generation of Extract, Transform, Load (ETL) loading procedures may be provided via the example mapping structure.

According to an example embodiment, data quality may be modeled efficiently in both data streams as well as relational databases. According to an example embodiment, jumping DQ windows may be used for propagation of data quality information from sensors through a data stream system up to a target database, while significantly reducing usage of resources. Jumping windows may thus be incorporated into an example DSMS metadata model to provide a uniform handling of data quality in data streams.

The example techniques discussed herein may provide an example mapping of the jumping windows data stream to windows in relational databases, as sensor data, including data quality, inserted in a persistent database may be very helpful for further analysis and knowledge discovery.

According to an example embodiment, jumping stream windows may be mapped to windows in a relational table. According to an example embodiment, an extended metadata model for the DBMS and the schema of required system and data quality tables may be used to manage and store DQ information in a consistent, persistent way.

Although accuracy and completeness have been discussed as two example DQ dimensions for sensor data streams, the example metadata models discussed herein may be extended, for example, by additional data quality dimensions. Further, the example metadata models discussed herein may provide an example mapping to "close the gap" between a streaming environment and a target database.

The example engines, managers, and/or sensors as shown in FIGS. 1 and 2 may be implemented as separate processors, or may be implemented as executable code that may be loaded and executed by a single processor. For example, the engines and managers may be implemented as software objects that may be compiled and stored in a nonvolatile memory, and may be loaded into a volatile memory for execution. For example, the engines, managers, and/or sensors may also be located on separate processors that may be distributed over a network such as the Internet, and may be executed in a distributed manner when needed.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented system including computer-executable code recorded on a computer-readable medium comprising:
    a data stream manager including:
    a data receiver configured via the computer-executable code to obtain a first data stream interval including a first group of data items and a first aggregated data quality value associated with a quality of obtaining the first group of data items and a second data stream interval including a second group of data items and a second aggregated data quality value associated with a quality of obtaining the second group of data items, each data item including one or more data attribute values, each data quality item including one or more data quality attribute values associated with one of the data items of the first group of data items or the second group of data items;
    a data selection manager configured via the computer-executable code to select the first aggregated data quality value and a first indicator associating the first aggregated data quality value with the first group of data items, and to select the first group of data items and to select the second aggregated data quality value and a second indicator associating the second aggregated data quality value with the second group of data items and to select the second group of data items;
    a data storage manager configured via the computer-executable code to store the first group of data items and the first indicator and the second group of data items and the second indicator in a user table associated with a relational database;
    a system table manager configured via the computer-executable code to determine a data quality table associated with the user table based on an entry in a system table; and
    a data quality storage manager configured via the computer-executable code to store the first aggregated data quality value and the first indicator and the second aggregated data quality value and the second indicator in the determined data quality table, wherein the data receiver is configured to:
    obtain a first jumping window including the first data stream interval including the first group of data items and the first aggregated data quality value, and
    obtain a second jumping window including the second data stream interval including the second group of data items and the second aggregated data quality value.

2. The system of claim 1, wherein the first indicator includes a timestamp value indicating a time associated with a first data item collected for transmission in the first data stream interval.

3. The system of claim 1, wherein the first indicator includes a timestamp value indicating a beginning of the first jumping window included in the first data stream interval.

4. The system of claim 1, wherein:
    the data storage manager is configured to store the first group of data items and timestamps associated with each data item in the first group in the user table associated with a relational database, wherein the timestamps include the first indicator.

5. The system of claim 1, wherein the determined data quality table is associated with the user table based on a column identifier stored in a system table describing the determined data quality table and a column identifier stored in a system table describing tables including the user table and the determined data quality table associated with the relational database.

6. The system of claim 1, wherein the determined data quality table includes one or more columns configured to store attribute values associated with aggregated data quality values and a column identifier associated with an associated data item stored in the user table.

7. The system of claim 1, wherein:
    the first jumping window and the second jumping window are nonoverlapping.

8. The system of claim 1, wherein the second group of data items is obtained immediately after the first group of data items is obtained, and wherein the first group of data items and the second group of data items are nonoverlapping.

9. The system of claim 1, wherein the first group of data items includes attribute values representing sensor measurement data, wherein sensor measurements include one or more of:
    a timestamp value,
    a pressure value,
    a temperature value,
    a light intensity value,
    a motion detection value,
    an air quality value,
    a location detection value, or
    a humidity detection value.

10. A method comprising:
    obtaining a first data stream interval including a first group of data items and a first aggregated data quality value associated with a quality of obtaining the first group of data items and a second data stream interval including a second group of data items and a second aggregated data quality value associated with a quality of obtaining the second group of data items, each data item including one or more data attribute values, each data quality item including one or more data quality attribute values associated with one of the data items of the first group of data items or the second group of data items;

selecting the first aggregated data quality value and a first indicator associating the first aggregated data quality value with the first group of data items and the second aggregated data quality value and a second indicator associating the second aggregated data quality value with the second group of data items;

selecting the first group of data items;

selecting the second group of data items;

storing the first group of data items and the first indicator and the second group of data items and the second indicator in a user table associated with a relational database;

determining a data quality table associated with the user table based on an entry in a system table; and storing the first aggregated data quality value and the first indicator and the second aggregated data quality value and the second indicator in the determined data quality table, wherein the obtaining comprises:

obtaining a first jumping window including the first data stream interval including the first group of data items and the first aggregated data quality value, and obtaining a second jumping window including the second data stream interval including the second group of data items and the second aggregated data quality value.

11. The method of claim 10, wherein the first indicator includes a timestamp value indicating a time associated with a first data item collected for transmission in the first data stream interval.

12. The method of claim 10, wherein the first indicator includes a timestamp value indicating a beginning of the first jumping window included in the first data stream interval.

13. The method of claim 10, wherein storing the first group of data items and the first indicator in a user table associated with a relational database comprises storing the first group of data items and timestamps associated with each data item in the first group in the user table associated with a relational database, wherein the timestamps include the first indicator.

14. The method of claim 10, wherein the determined data quality table is associated with the user table based on a column identifier stored in a system table describing the determined data quality table and a column identifier stored in a system table describing tables including the user table and the determined data quality table associated with the relational database.

15. The method of claim 10, wherein the determined data quality table includes one or more columns configured to store attribute values associated with aggregated data quality values and a column identifier associated with an associated data item stored in the user table.

16. The method of claim 10, wherein:
the first jumping window and the second jumping window are nonoverlapping.

17. The method of claim 10, wherein the second group of data items is obtained immediately after the first group of data items is obtained, and wherein the first group of data items and the second group of data items are nonoverlapping.

18. The method of claim 10, wherein the first group of data items includes attribute values associated with data sources.

19. The method of claim 10, wherein the first group of data items includes attribute values associated with sensor measurements.

20. The method of claim 10, wherein the first group of data items includes attribute values representing sensor measurement data, wherein sensor measurements include one or more of:
a timestamp value,
a pressure value,
a temperature value,
a light intensity value,
a motion detection value,
an air quality value,
a location detection value, or
a humidity detection value.

21. A method comprising:
requesting a first group of data items and a second group of data items from a relational database;

requesting a first aggregated data quality value associated with a quality of obtaining the first group of data items and a first indicator associating the first aggregated data quality value with the first group of data items and a second aggregated data quality value associated with a quality of obtaining the second group of data items and a second indicator associating the second aggregated data quality value with the second group of data items;

retrieving the first group of data items and the second group of data items from a user table associated with the relational database;

determining a data quality table associated with the user table based on an entry in a system table;

retrieving the first aggregated data quality value and the first indicator and the second aggregated data quality value and the second indicator from the determined data quality table;

obtaining a first jumping window including a first data stream interval including the first group of data items and the first aggregated data quality value; and obtaining a second jumping window including a second data stream interval including the second group of data items and the second aggregated data quality value.

22. A computer program product being tangibly embodied on a computer-readable medium and being configured to cause a data processing apparatus to:

obtain a first data stream interval including a first group of data items and a first aggregated data quality value associated with a quality of obtaining the first group of data items and a second data stream interval including a second group of data items and a second aggregated data quality value associated with a quality of obtaining the second group of data items, each data item including one or more data attribute values, each data quality item including one or more data quality attribute values associated with one of the data items of the first group of data items or the second group of data items;

select the first aggregated data quality value and a first indicator associating the first aggregated data quality value with the first group of data items and select the second aggregated data quality value and a second indicator associating the second aggregated data quality value with the second group of data items;

select the first group of data items;

select the second group of data items;

store the first group of data items and the first indicator and the second group of data items and the second indicator in a user table associated with a relational database;

determine a data quality table associated with the user table based on an entry in a system table; and store the first aggregated data quality value and the first indicator and the second aggregated data quality value and the second indicator in the determined data quality table, wherein the data processing apparatus is caused to:

obtain a first jumping window including the first data stream interval including the first group of data items and the first aggregated data quality value, and obtain a second jumping window including the second data stream interval including the second group of data items and the second aggregated data quality value.

23. The computer program product of claim 22, further configured to cause the data processing apparatus to:

store the first group of data items and timestamps associated with each data item in the first group in the user table associated with a relational database, wherein the timestamps include the first indicator.

24. The computer program product of claim 23, wherein the determined data quality table is associated with the user table based on a column identifier stored in a system table describing the determined data quality table and a column identifier stored in a system table describing tables including the user table and the determined data quality table associated with the relational database.

* * * * *